(12) United States Patent
Kim et al.

(10) Patent No.: US 8,482,615 B2
(45) Date of Patent: Jul. 9, 2013

(54) METHOD FOR CONTROLLING DISPLAY FOR INITIAL SETTING AND DISPLAY DEVICE USING THE SAME

(75) Inventors: Young-chan Kim, Uiwang-si (KR); Hwa-jun Du, Anyang-si (KR); Cheon-yong Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1404 days.

(21) Appl. No.: 12/026,037

(22) Filed: Feb. 5, 2008

(65) Prior Publication Data

US 2009/0033775 A1 Feb. 5, 2009

(30) Foreign Application Priority Data

Aug. 3, 2007 (KR) ........................ 10-2007-0078260

(51) Int. Cl.
*H04N 17/00* (2006.01)
(52) U.S. Cl.
USPC ............ 348/181; 725/151; 348/177; 348/178
(58) Field of Classification Search
USPC ................. 348/177–179, 181, 182, 246, 247, 348/189, 190; 445/63
See application file for complete search history.

(56) References Cited

U.S. PATENT DOCUMENTS

| | | | |
|---|---|---|---|
| 5,396,546 A * | 3/1995 | Remillard | 379/93.24 |
| 5,537,145 A * | 7/1996 | Miseli | 348/181 |
| 5,638,117 A * | 6/1997 | Engeldrum et al. | 348/179 |
| 5,659,338 A * | 8/1997 | Nakasuji et al. | 345/536 |
| 5,739,809 A | 4/1998 | McLaughlin et al. | |
| 7,515,212 B2 * | 4/2009 | Katayama | 348/738 |
| 2004/0034861 A1 | 2/2004 | Ballai | |
| 2006/0012683 A9 * | 1/2006 | Lao et al. | 348/207.99 |
| 2006/0066642 A1 | 3/2006 | Ookawara et al. | |
| 2006/0227085 A1 | 10/2006 | Boldt et al. | |
| 2008/0175506 A1 | 7/2008 | Ota | |

FOREIGN PATENT DOCUMENTS

| | | | |
|---|---|---|---|
| EP | 0 599 339 A2 | 6/1994 | |
| EP | 1 280 059 A2 | 1/2003 | |
| EP | 1 746 493 A2 | 1/2007 | |

* cited by examiner

*Primary Examiner* — James R Sheleheda
*Assistant Examiner* — Timothy Newlin
(74) *Attorney, Agent, or Firm* — Sughrue Mion, PLLC

(57) ABSTRACT

When a user uses a display device for the first time in a factory mode, whether or not there are defective pixels is examined, and a guide message for setting initial settings is provided, so the user can use the display device in an optimal environment. As a result, if the display device has defective pixels, the user can be provided with after-sales service at an appropriate time, and use the display device at its full potential in an environment most suitable for the display device is set.

14 Claims, 5 Drawing Sheets

(A)

(B)

(C)

(D)

METHOD FOR CONTROLLING DISPLAY FOR INITIAL SETTING AND DISPLAY DEVICE USING THE SAME

CROSS-REFERENCE TO RELATED APPLICATIONS

This application claims priority from Korean Patent Application No. 10-2007-0078260, filed on Aug. 3, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to providing a display device and a controlling method thereof, and more particularly, to providing a display device which displays a screen for setting a user environment and screen patterns, and a method thereof.

2. Description of the Related Art

After a user purchases a display device, the first things the user should do is to examine whether the panel of the display device has defective pixels, and to set an environment most suitable for the display device, such as the screen resolution and color settings.

Defective pixels are pixels having physical defects visible on a liquid crystal display (LCD) screen. Colors on the LCD are expressed using red, green, and blue (R, G, B) lights. However, when one or more of the three lights is not lit due to physical or electrical defects, this is called a defective pixel. In order to examine the defective pixel, a black image is displayed covering on the entire screen, and the user may check for the presence of white dots. Recently, utilities providing this function have become available.

The most suitable environment includes an appropriate screen resolution, colors, and refresh rate. Such an environment varies according to the size or performance of the display device, so if a new display device is installed, the most suitable environment changes. A utility compact disc (CD) to set an environment most suitable for the display device is generally provided.

Such a process of examining the display device and setting the environment needs to be performed once at the initial setting, but many users do not know to or forget to do so. As a result, even if the display device has defective pixels, users cannot be provided with after-sales service at the appropriate time, and cannot use the display device at its full potential as no suitable environment is set.

SUMMARY OF THE INVENTION

Exemplary embodiments of the present invention overcome the above problems and/or disadvantages and other disadvantages not described above. Also, the present invention is not required to overcome the disadvantages described above, and an exemplary embodiment of the present invention may not overcome any of the problems described above.

Exemplary embodiments of the present invention provide a display device which examines whether the display device has defects at initial use, and guides the user through the process of setting an optimal environment, and a method thereof As a result, users are prevented from using a display device having defects or using a display device wherein the optimal environment has not been set.

According to an aspect of the present invention, there is provided a control method of a display device, including turning on the display device, determining whether or not the display device is in a preset particular mode, and operating the display device to output image data relating to the state of the display device if the display device is in the preset particular mode.

In the determination, whether or not the display device is in the preset particular mode is determined according to a variable corresponding to the number of times the display device has been turned on.

The image data are image data corresponding to at least one pattern in order for a user to determine whether or not there are defective pixels in a panel of the display device.

Each pattern may include a single color.

Each pattern may include a plurality of sections, each of which has a single color.

The method further includes determining whether or not a signal is input from an external device.

The image data are image data corresponding to a guide message for an environment setup program for the display device.

The method further includes determining whether or not a program which is the same as the environment setup program has previously been installed in the external device.

In the determination, if the program which is the same as the environment setup program has previously been installed in the external device, the version of the previously installed program is determined.

The guide message is a message corresponding to the determination result.

According to another aspect of the present invention, there is provided a display device including a display unit which outputs an image, and a control unit which determines whether or not the display device is in a preset particular mode, and operates the display unit to output image data relating to the state of the display device if the display device is in the preset particular mode.

The control unit determines whether or not the display device is in the preset particular mode according to a variable corresponding to the number of times the display device has been turned on.

The image data are image data corresponding to at least one pattern in order for a user to determine whether or not there are defective pixels in a panel of the display device.

Each pattern may include a single color.

Each pattern may include a plurality of sections, each of which has a single color.

The control unit determines whether or not a signal is input from an external device.

The image data are image data corresponding to a guide message for an environment setup program for the display device.

The control unit determines whether or not a program which is the same as the environment setup program has previously been installed in the external device.

If the program which is the same as the environment setup program has previously been installed in the external device, the control unit determines the version of the previously installed program.

The guide message is a message corresponding to the determination result.

BRIEF DESCRIPTION OF THE DRAWINGS

The aspects of the present invention will become more apparent by describing exemplary embodiments of the present invention thereof with reference to the accompanying drawings, in which.

DETAILED DESCRIPTION OF EXEMPLARY EMBODIMENTS OF THE INVENTION

Figure 1:
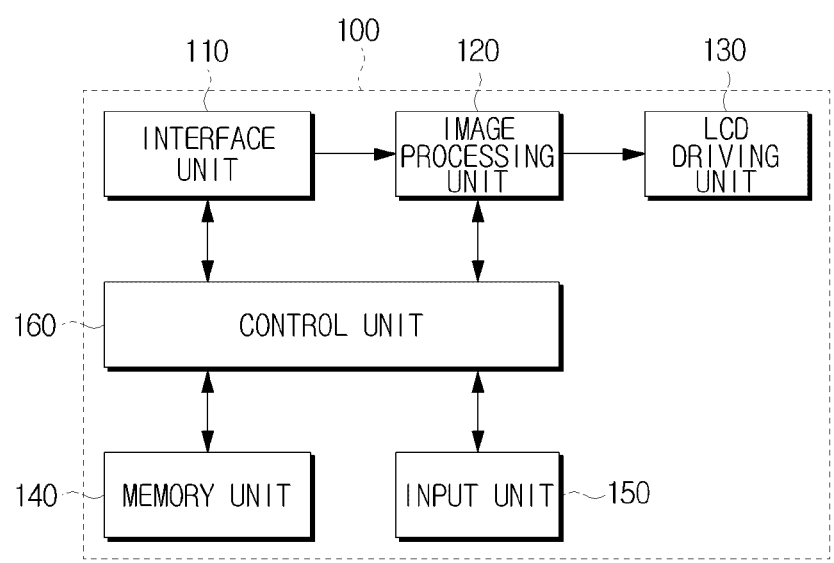
FIG. 1 is a block diagram of a display device according to an exemplary embodiment of the present invention.

The present invention will now be described in greater detail with reference to the accompanying drawings, in which exemplary embodiments of the invention are shown. The invention may, however, be embodied in many different forms and should not be construed as being limited to the embodiments set for the therein; rather, these embodiments are provided so that this disclosure will be thorough and complete, and will fully convey the concept of the invention to those skilled in the art.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram illustrating the structure of a display device according to an exemplary embodiment of the present invention. The display device 100 includes an interface unit 110, an image processing unit 120, a liquid crystal display (LCD) driving unit 130, a memory unit 140, an input unit 150, and a control unit 160.

The interface unit 110 receives image information from an external device, and the image processing unit 120 processes the input image information to be divided into R, G, and B signals, and outputs the image data to the LCD driving unit 130.

The LCD driving unit 130 receives image signals from the image processing unit 120, and displays the image signals on an LCD panel.

The memory unit 140 stores diverse data which are necessary to the control unit 160.

The input unit 150 has a variety of function keys to control the operation of the display device 100, and provides commands corresponding to keys selected by a user to the control unit 160.

The control unit 160 controls the entire operation of the display device 100. In the present invention, if the display device 100 is in a factory mode, the control unit 160 operates the image processing unit 120 to display a screen for setting initial settings. This process will be explained in detail.

Figure 2:
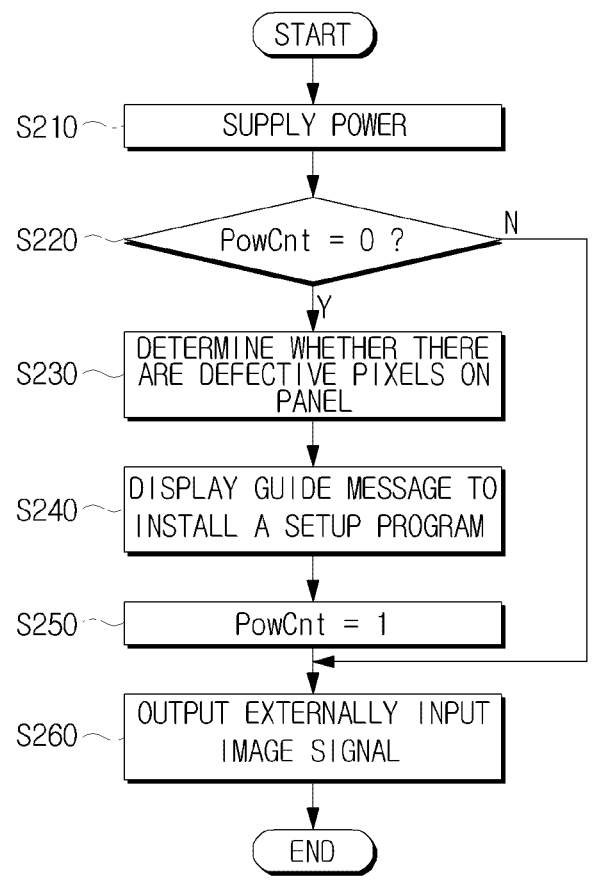
FIG. 2 is a flow chart illustrating a method of displaying an initial setting screen for a display device according to an exemplary embodiment of the present invention.

FIG. 2 is a flow chart illustrating a method of displaying an initial setting screen of a display device according to an exemplary embodiment of the present invention.

In operation S210, whether the display device is turned on is determined. In operation S220, if the display device is turned on, whether or not a variable value PowCnt is 0 is determined. The variable value is used to determine whether the display device is in a factory mode, and the initial value is set to 0 when the display device is manufactured.

In the present invention, the factory mode also (called a factory manufacture mode) refers to the state of the display device at the time of manufacture, before the user uses the display device. The value set when the display device is manufactured is called the factory mode. If the user turns on the display device for use, the display device is not in a factory mode. It is also possible to set the display device to be set to factory mode by the user or after-sales service center.

If PowCnt is not 0 in operation S220-N, the display device is not in factory mode, so operation S260 can be performed directly and image signals input from an external device are thus output. That is, the control unit 160 transmits the image signals received from the external device (e.g., a personal computer) connected to the interface unit 110 to the image processing unit 120, and the image signals are transmitted to the LCD driving unit 130 and displayed. If any image signals are not received, a message indicating "No signal received" may be displayed in a black screen.

If PowCnt is 0 in operation S220-Y, the display device is in factory mode, so the control unit 160 operates the image processing unit 120 to output a screen to check defective pixels on the panel in operation S230. An example of a screen to check defective pixels in the panel is illustrated in FIG. 3.

Figure 3:
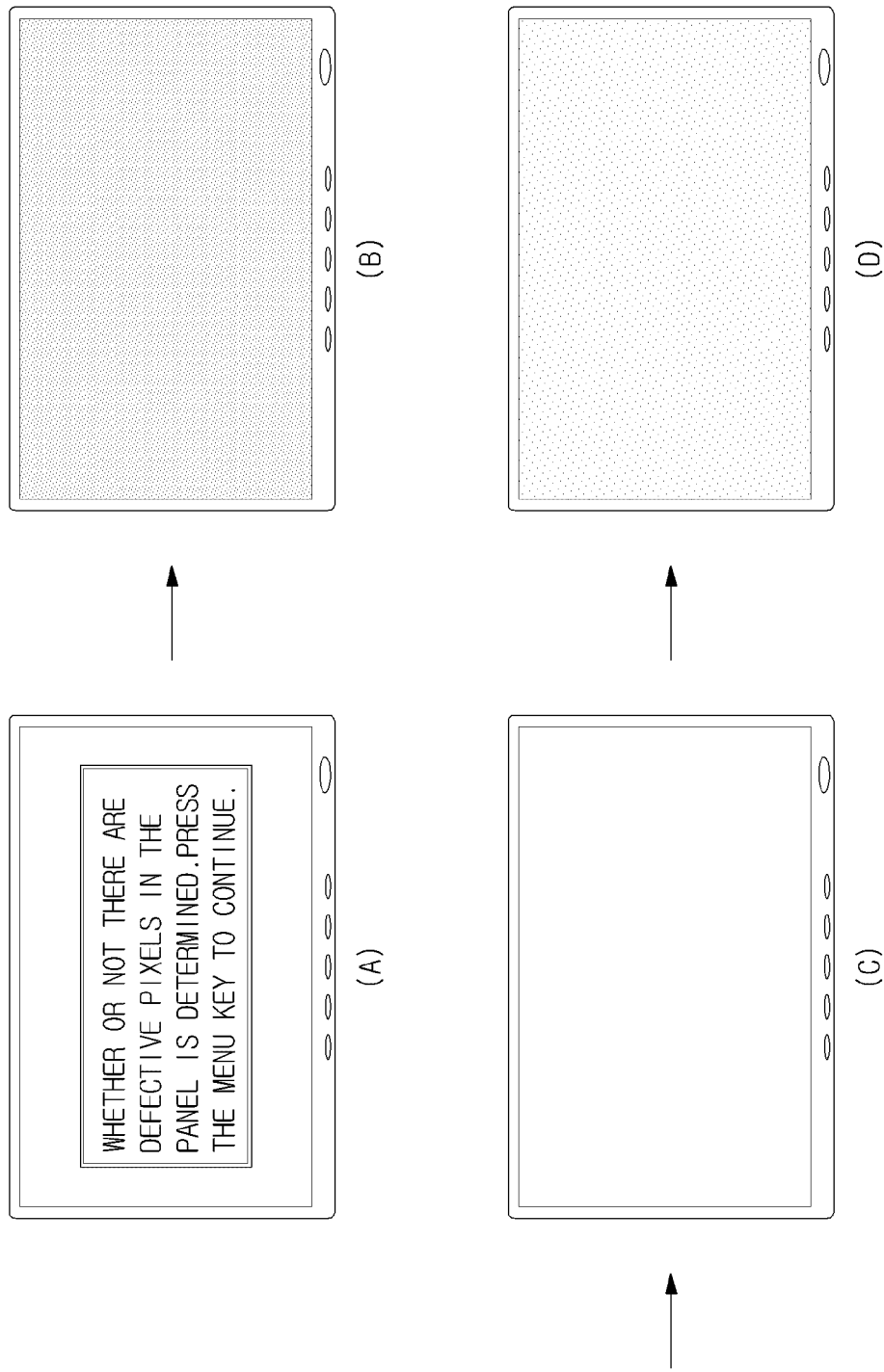
FIG. 3 illustrates exemplary screens for detecting defective pixels in a display panel according to an exemplary embodiment of the present invention.

FIG. 3 illustrates an example of screens to check defective pixels of the display panel in four steps. In (a) of FIG. 3, a guide message is displayed so that the user is not startled. The user presses a menu key on the input unit 150, and the control unit 160 operates the image processing unit 120 to display a black screen, as shown in (b) of FIG. 3. Accordingly, the user can notice pixels which are not black against the black screen as defective pixels. Next, if the user presses the menu key over and over again, the screen is sequentially changed to a white screen, as shown in (c) of FIG. 3, and then to a blue screen, as shown in (d) of FIG. 3, so that the user can examine whether there are defective pixels. Each step may be automatically passed without the user pressing the menu key, but in order to give the user enough time to examine, it is preferable that the screen is changed whenever the menu key is pressed.

Of course, the black, white and blue screens can be replaced with red, green, and blue screens.

Furthermore, the entire screen may consist of a single color as described above, or half may be red and the other half green to examine whether there are defective pixels.

Returning to FIG. 2, a guide message to install a setup program is displayed in operation S240. An example of such a message is shown in FIG. 4.

Figure 4:
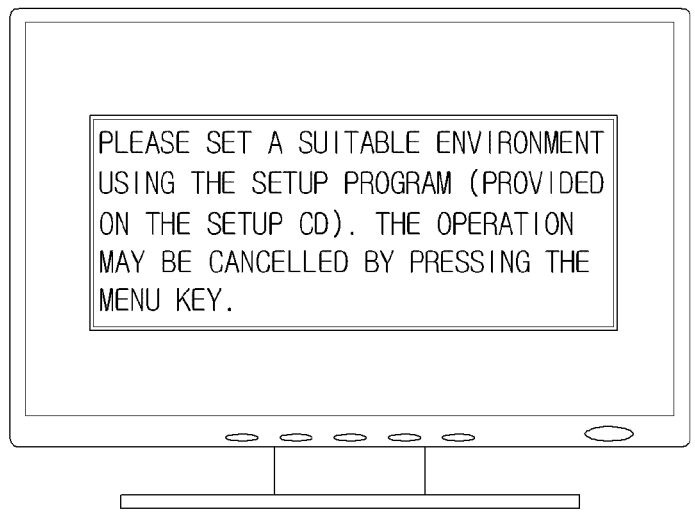
FIG. 4 illustrates an exemplary screen showing a guide message in a display device according to an exemplary embodiment of the present invention.

Such as the message shown in FIG. 4, a guide message is displayed so that the user does not skip installing a setup CD provided with the display device. The setup CD is a program that is usually run on a personal computer (PC), and is used to set the display device.

The control unit 160 transmits a control signal to the PC, which is an external device connected to the display device, and determines whether or not the setup CD has been already installed. A guide message to install a setup program is output only when the setup CD has not been installed. In other words, whether or not a program the same as the program on the setup CD has been already installed on the external device is determined. If the program has not been installed, a message guiding the user through the process of installation of the program is output as shown in FIG. 4.

If the program has been already installed, the version of the program in the setup CD is compared with that of the previously installed program. If the previously installed program is a later version, a message such as "The installed program is a later version, so the setup CD does not need to be installed" is displayed. If the version of the already installed program is the same as that of the program on the setup CD, a message such as "The version of the program on this setup CD has been installed already, so the setup CD does not need to be installed" is displayed.

However, if the previously installed program is an older version of the program on the setup CD, a message such as "Upgrade the program using the setup program (provided on the CD)" is displayed.

Returning to FIG. 2 again, if it has been determined whether there are defective pixels on the panel and the setup CD installation has been completed, the PowCnt variable becomes 1 so that these processes cannot be performed again in operation S250. However, if the user desires to perform these processes again, the user can reset the PowCnt variable to 0.

The PowCnt variable can be reset.

Subsequently, the display device performs the original object of receiving and outputting image signals from the connected external device in operation S260.

The process of controlling the display device to display a screen for setting initial settings after the determination of whether or not the display device is set to factory mode has been described above in the exemplary embodiment.

In the exemplary embodiment, the mode is determined to be a factory mode when PowCnt is 0, but the mode may be determined to be a factory mode when PowCnt is 1, or another value.

Moreover, in the exemplary embodiment, whether or not there are defective pixels in the panel is determined in operation S230, and installation of the setup program is performed in operation S240, but the two operations need not both be performed in their entirety. For example, if the mode of the display device is determined to be a factory mode, only installation of the setup program may need to be directly performed.

In addition, in the exemplary embodiment, a screen for setting initial settings is displayed in the case of a factory mode, but the present invention is not limited thereto. The screen for setting initial settings may also be displayed in other modes.

Furthermore, in the exemplary embodiment, whether or not the panel of the display device has defective pixels is determined, but this is merely an exemplary embodiment for ease of explanation. The technical idea of the present invention can be applied when the degree of panel distortion, whether or not color deteriorates, and whether or not after-images exist are determined.

In addition, in the exemplary embodiment, whether or not there are defective pixels in the panel is determined, and displaying a guide for installing a setup program is an example of a screen for setting initial settings, and a screen for setting initial settings is not limited thereto. Diverse screens such as a screen for setting the optimal screen resolution, a screen for setting auto-color, a screen for automatically adjusting the image quality, and a screen for adjusting fonts can also be displayed.

In addition, in the exemplary embodiment, the operations S230 and S240 are performed in factory mode, but the present invention is not limited thereto. Although the display device is not in factory mode at a particular time, for example, when the use time has reached 100 hours, or when the number of times of use has reached 100, operations S230 and S240 may be performed.

Another exemplary embodiment of the present invention is described with reference to FIGS. 5 to 7.

Figure 5:
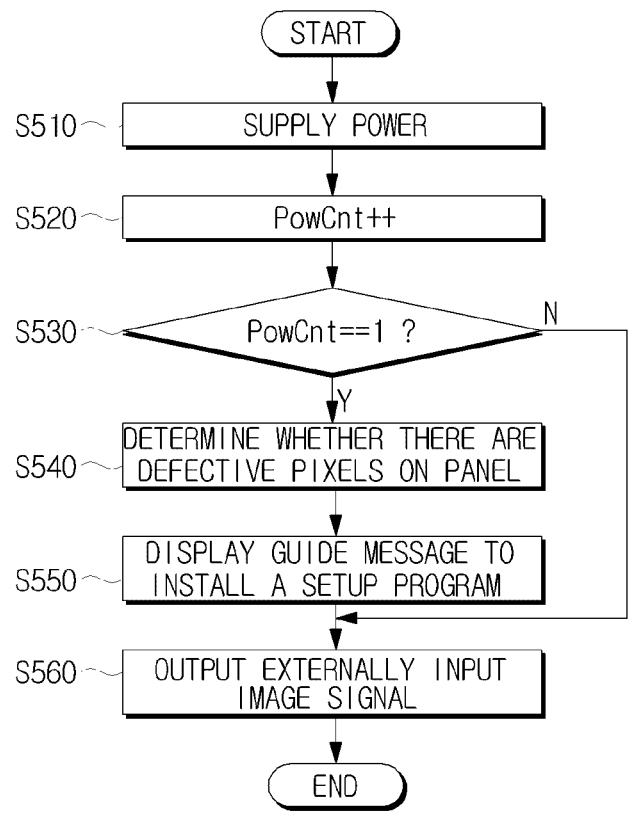
FIG. 5 is a flow chart illustrating a method of displaying an initial setting screen for a display device according to another exemplary embodiment of the present invention.

FIG. 5 is a flow chart illustrating a method of displaying an initial setting screen of a display device according to another exemplary embodiment of the present invention.

In operation S510, whether the display device is turned on is determined. In operation S520, if the display device is turned on, 1 is added to a PowCnt variable value. The PowCnt variable value is used to determine how many times the display device is turned on, and is set to 0 as an initial value at the time of manufacture.

Subsequently, in operation S530, whether or not the PowCnt variable value is 1 is determined. That is, whether the user turns on the display device for the first time is checked. This is because the process of the present invention must be used once only when at the time of initial use, and the process of the present invention can be prevented from being repeated.

If PowCnt is not 1 in operation S530-N, the display device has performed the process of the present invention once, so operation S560 is performed directly and image signals received from an external device are thus output. That is, the control unit 160 transmits the image signals received from the personal computer connected to the interface unit 110 to the image processing unit 120, and the image signals are transmitted to the LCD driving unit 130 and displayed. If no image signals are received, a message indicating "No signal received" may be displayed on a black screen.

If PowCnt is 1 in operation S530-Y, the display device is being used for the first time by the user, so the control unit 160 operates the image processing unit 120 to output a screen to check defective pixels on the panel in operation S540, and displays a guide message in order for the user to install the setup program in operation S550. Operations S540 and S550 are similar to operations S230 and S240 of FIG. 2, so detailed description is omitted here.

If checking defective pixels and displaying a guide message in order for the user to install the setup program have been completed, the display device performs the original object of receiving and outputting image signals from the connected external device in operation S560.

Figure 6:
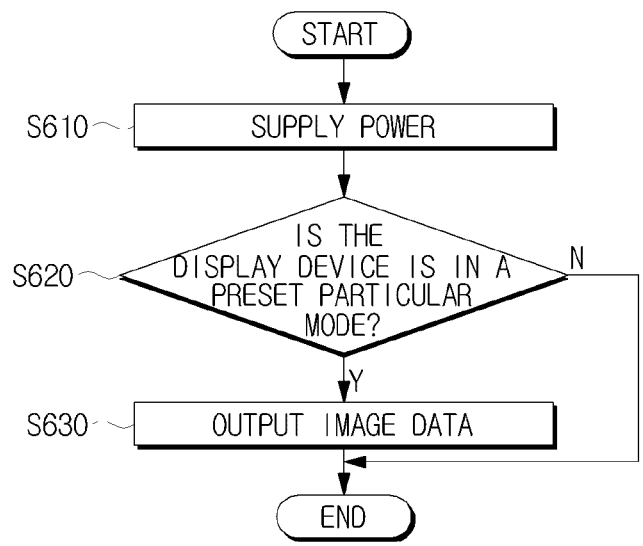
FIG. 6 is a flow chart illustrating a method of displaying an initial setting screen for a display device according to yet another exemplary embodiment of the present invention.

With reference to FIG. 6 illustrating a control method of a display device, the display device is turned on in operation S610, and whether or not the display device is in a preset particular mode is determined in operation S620. If the display device is in the preset particular mode, image data relating to the state of the display device are output in operation S630.

Figure 7:
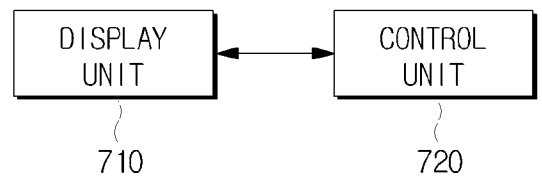
FIG. 7 is a block diagram of a display device according to another exemplary embodiment of the present invention.

As shown in FIG. 7, a display device according to another exemplary embodiment of the present invention includes a display unit 710, and a control unit 720. The display unit 710 outputs a screen, and the control unit 720 determines whether or not the display device is in a preset particular mode. If the display device is in the preset particular mode, the control unit 720 operates the display unit 710 to output image data relating to the state of the display device.

Consequently, when the display device is used for the first time, the display device can be controlled to be used in optimal environment.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method of controlling a display device, comprising:
   turning on the display device;
   determining a number of times that the display device has been turned on; and
   operating the display device to output image data in order to determine whether or not there are defective pixels in a panel of the display device and a guide message for an environment setup program for the display device only if the number of times the display device has been turned on is 1.

2. The method of claim 1, wherein the image data are image data corresponding to at least one pattern in order to determine whether or not there are defective pixels in a panel of the display device.

3. The method of claim 2, wherein each pattern of the at least one pattern has a corresponding single color.

4. The method of claim 2, wherein each pattern of the at least one pattern comprises a plurality of sections, each of which has a corresponding single color.

5. The method of claim 1, further comprising determining whether or not a signal is input from an external device,
   wherein the guide message is displayed if the signal is input from the external device.

6. The method of claim 5, further comprising determining whether or not a program which is the same as the environment setup program has previously been installed in the external device,
   wherein the guide message is a message corresponding to a result of the determining whether or not the program which is the same as the environment setup program has previously been installed.

7. The method of claim 6, further comprising determining a version of the previously installed program if the program which is the same as the environment setup program has previously been installed in the external device,
   wherein the guide message is a message corresponding to a result of the determining the version of the previously installed program.

8. A display device comprising:
   a display unit which outputs an image; and
   a control unit which determines a number of times that the display device has been turned on, and operates the display unit to output image data in order to determine whether or not there are defective pixels in a panel of the display device and a guide message for an environment setup program for the display device only if the number of times the display device has been turned on is 1.

9. The display device of claim 8, wherein the image data are image data corresponding to at least one pattern in order to determine whether or not there is defective pixels in a panel of the display device.

10. The display device of claim 9, wherein each pattern of the at least one pattern has a corresponding single color.

11. The display device of claim 9, wherein each pattern of the at least one pattern comprises a plurality of sections, each of which has a corresponding single color.

12. The display device of claim 8, wherein the control unit further determines whether or not a signal is input from an external device, and
    displays the guide message if the signal is input from the external device.

13. The display device of claim 12, wherein the control unit further determines whether or not a program which is the same as the environment setup program has previously been installed in the external device,
    wherein the guide message is a message corresponding to a result of the determining whether or not the program which is the same as the environment setup program has previously been installed.

14. The display device of claim 13, wherein if the program which is the same as the environment setup program has previously been installed in the external device, the control unit determines a version of the previously installed program,
    wherein the guide message is a message corresponding to a result of the determining the version of the previously installed program.

* * * * *